May 9, 1967 A. I. BEAN 3,318,194
GEAR SHAPER BACK-OFF MECHANISM
Filed July 22, 1965 4 Sheets-Sheet 1

INVENTOR.
ARTHUR I. BEAN
BY
HIS ATTORNEY

May 9, 1967 A. I. BEAN 3,318,194
GEAR SHAPER BACK-OFF MECHANISM
Filed July 22, 1965 4 Sheets-Sheet 3

INVENTOR.
ARTHUR I. BEAN
BY
HIS ATTORNEY

INVENTOR.
ARTHUR I. BEAN

3,318,194
GEAR SHAPER BACK-OFF MECHANISM
Arthur Insley Bean, Springfield, Vt., assignor to The Fellows Gear Shaper Company, Springfield, Vt., a corporation of Vermont
Filed July 22, 1965, Ser. No. 473,941
7 Claims. (Cl. 90—7)

The present invention pertains to machine tools and particularly to the art of generating and cutting gears by the use of a rotating cutter which is reciprocated relative to a workpiece which is correspondingly rotated in harmony and timed relation to the rotation of the cutter as is well known in gear shapers of the Fellows type.

A primary object of the invention is to provide a new and simple mechanism for backing off or relieving the cutter spindle relative to the work during the return or non-cutting stroke of the cutter so that the cutter will not rub on the work and destroy the cutting edge on the cutter and spoil the finish on the work piece being formed.

A second object of the invention is to provide a means to vary the direction of the backing off action of the cutter relative to the work depending on the direction of back-off of the cutter desired while cutting a given work piece and also the relative proportions of the diameters of the cutter and work so as to better eliminate the possibility of rub which is effected by the rotational directions and the relative diameters of cutter and work.

Another object of the invention is to provide a mechanism which will back off the cutter from the work in any desired direction and which includes a means to change the direction of back-off while cutting if desired. The ability to change the back-off angle while actually cutting is of particular importance in the cutting of non-circular gears where the relationship of the pitch diameters of the cutter and work is changing during the cutting action.

Another object of the invention is to provide a simple mechanism which will operate with the necessary speed to back off or relieve the cutter from the work and which will accurately determine the direction of back-off in accordance with the cutting relation between the cutter and work.

A relieving cutter spindle of the general type such as concerned with the present invention is shown in the patent of A. I. Bean, No. 2,736,240 issued Feb. 28, 1956.

A gear shaper having a means for changing the direction of back off in two predetermined directions upon the reversal of feed when cutting two successive gears is disclosed in the patent of E. W. Miller, No. 2,640,397 issued June 2, 1953.

In the accompanying drawings.

Like reference characters designate the same parts wherever they occur in all figures.

Figure 1:
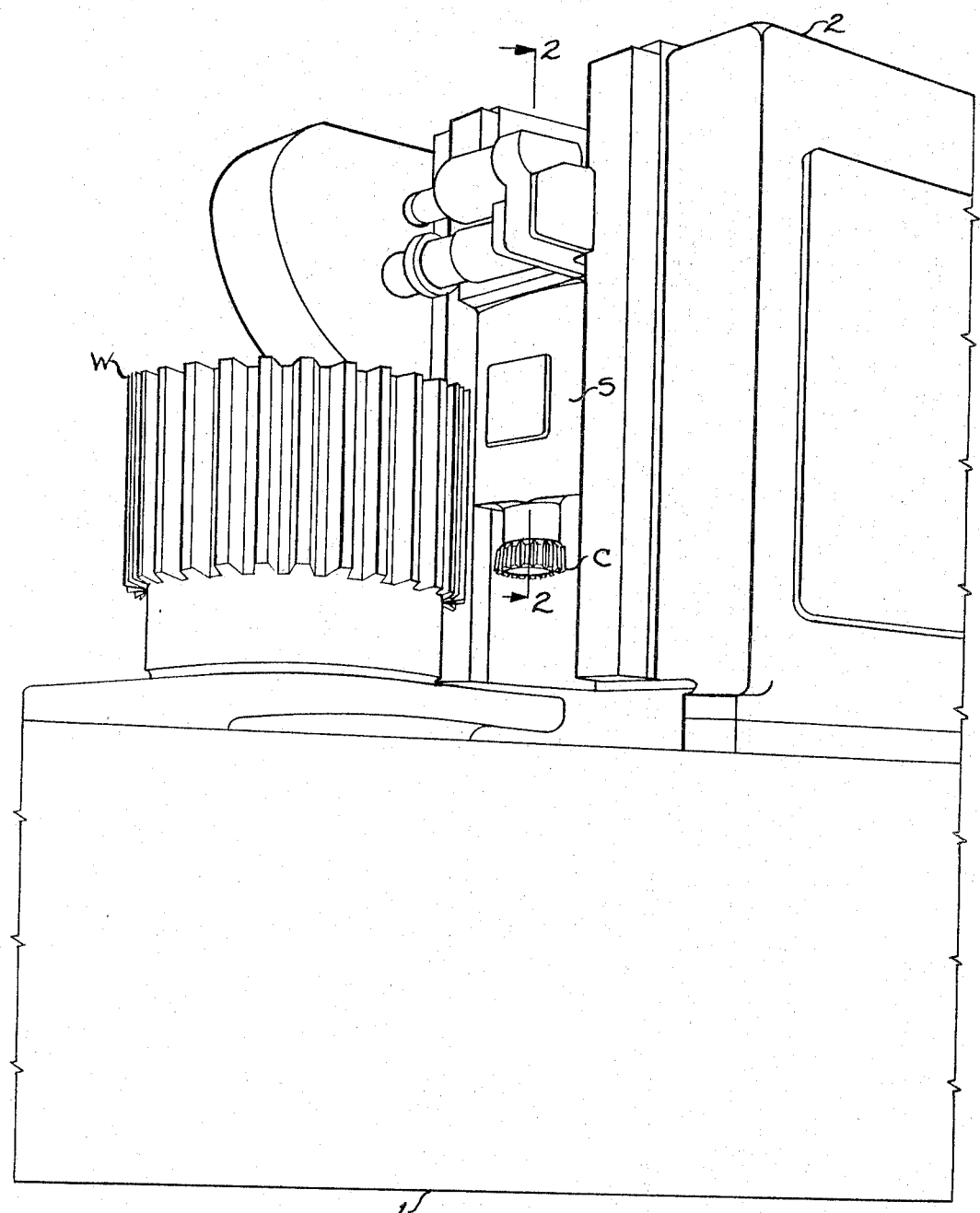
FIGURE 1 is a front elevation of a machine of the type in which the present invention may be employed.

As shown in FIGURE 1, a gear shaper having a base 1 has fixed thereto a column 2. This column 2 has slideably mounted thereon a cutter carrying slide S. The slide S has fixed on its lower end a cutter C.

Rotatably mounted in base 1 is a work spindle (not shown) which carries the work piece W.

Figure 2:
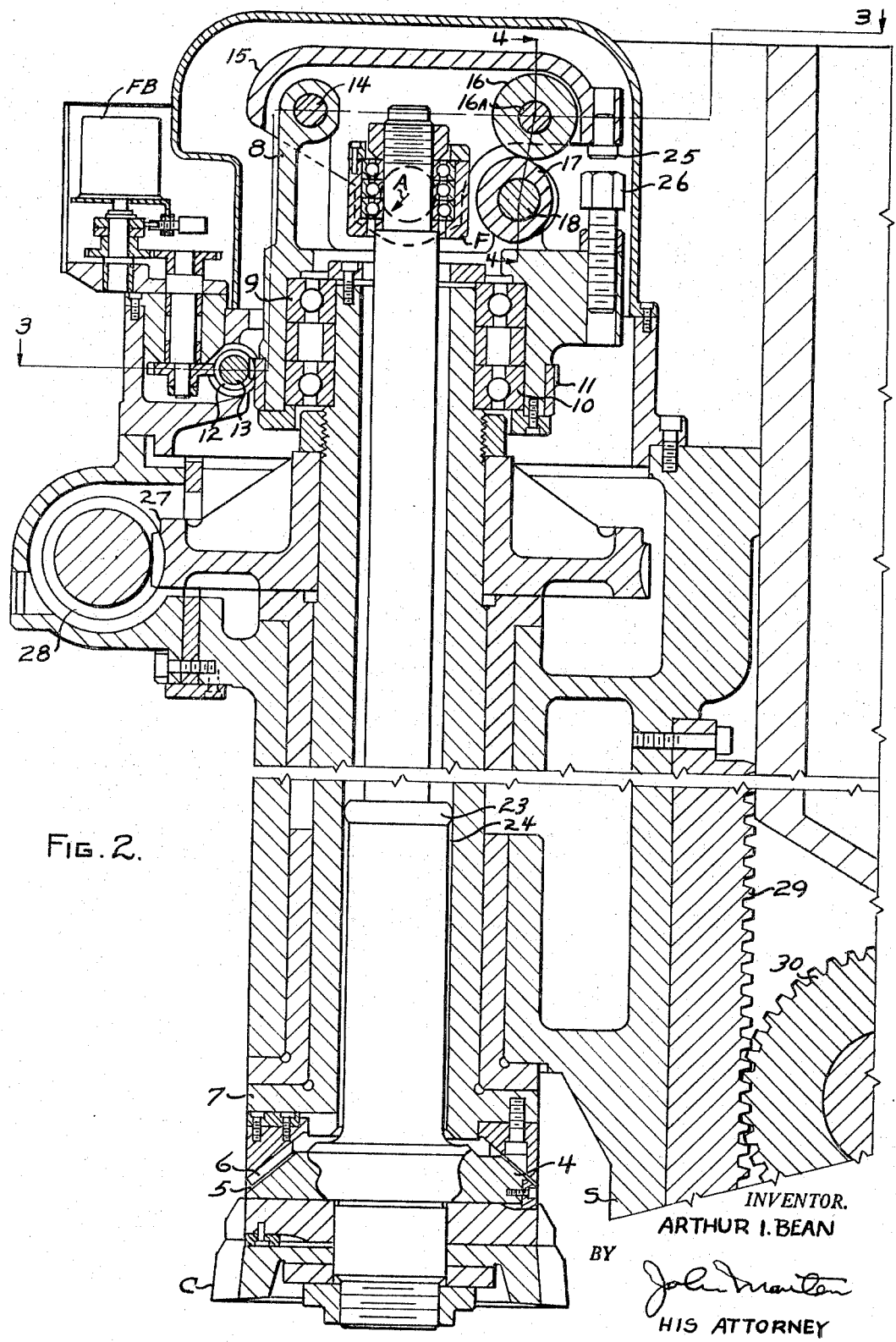
FIGURE 2 is a vertical sectional view taken along the line 2—2 of FIGURE 1 and showing the cutter spindle mechanism.

Shown in FIGURE 2 is the cutter C. The cutter C is fixed to rotate with and is carried by the cutter spindle adapter 4. This adapter 4 has clutch teeth 5 formed thereon which are shaped so as to be complemental to similar teeth 6 formed on the end of cutter spindle 7. These clutch teeth are similar and function in the same manner as teeth 9 and 10 of the above-mentioned Bean patent.

On the upper end of cutter spindle 7 is mounted a cage member 8. In order to enable the cage 8 to rotate about the cutter spindle 7, it is mounted on ball bearings 9 and 10 which are in turn mounted on the upper end of the spindle 7 as shown in FIGURE 2.

Figure 3:
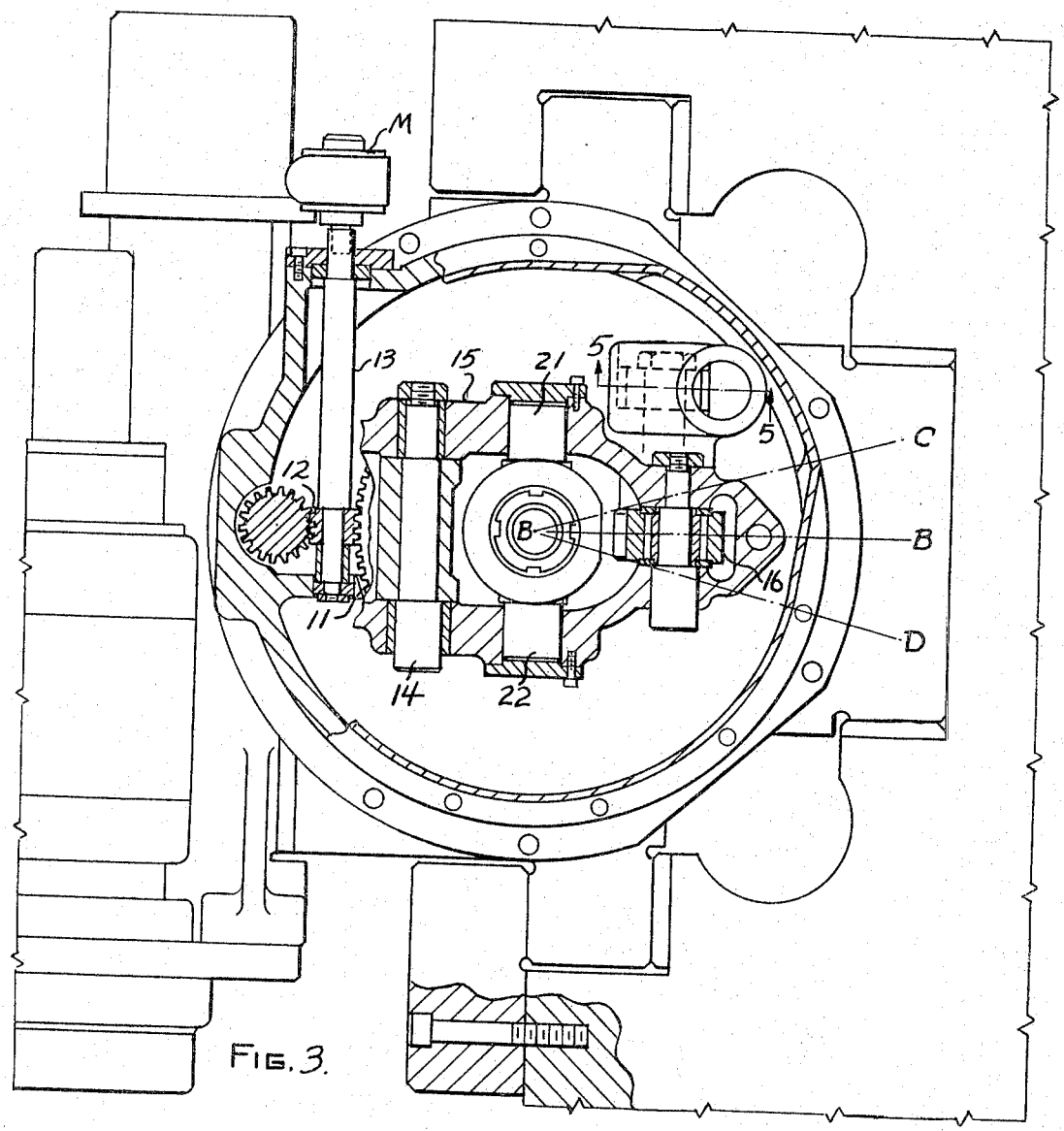
FIGURE 3 is a horizontaal sectional view taken along the line 3—3 of FIGURE 2.

The cage 8 carries a worm wheel 11 at its lower end. This worm wheel 11 is in mesh with a worm 12 mounted on shaft 13 (FIGURES 2 and 3). The shaft 13 may be rotated by a motor M or, if desired, can be arranged to be manually rotated.

On the upper end of cage 8 is fixed a pivot pin 14. On the pin 14 is mounted a carrier member 15. This carrier 15 has a roller member 16 rotatably mounted and for purposes set forth below this roller 16 is carried on an eccentric shaft 16A.

Mounted in the cage 8 is a cam 17. This cam 17 is carried on the shaft 18 and is keyed to this shaft so that when the shaft is rotated the cam will rotate accordingly.

On one end of shaft 18 is keyed a gear 19 which is in mesh with a rack 20. This rack 20 is reciprocable by any suitable means such as a hydraulic or pneumatic piston and cylinder arrangement.

Encircling the upper end of the adapter 4 is a frame member F. This frame member F is rotatably mounted on the adapter 4 through the medium of suitable ball bearings and is held against movement longitudinally of the adapter by any obvious means such as a shoulder and nut construction as seen in FIGURE 2. Formed on the frame F are two opposed pivots 21 and 22 which extend into openings in the carrier 15 (see FIGURE 3).

As shown in FIGURE 2, the adapter 4 has formed thereon an arcuate shoulder 23 which fits in the bore 24 of adapter 4, but is slideable therein. It will be apparent that upon motion of the adapter 4 about the shoulder 23 the cutter C will move toward or away from the work W.

As seen in FIGURE 2, as the cam 17 is rotated so that its lowest portion is in contact with the roller 16, the carrier 15 will drop and pivot clockwise about the pivot pin 14. The center of pivots 21 and 22 will move in the direction of the arrow A carrying with it the adapter 4. This will cause the lower end of the adapter 4 to move downward so that clutch teeth 5 and 6 are disengaged. Simultaneously the adapter 4 will pivot about shoulder 23 and the lower end of the adapter 4 will not only move downwardly but will move in a counterclockwise direction or to the right so that the cutter C is moved away from the work piece W.

An adjustable stop is provided to limit the movement of carrier 15. This adjustable stop mechanism consists of an abutment pin 25 and an adjustable abutment 26 threaded into cage member 8. It will be apparent that by varying the space between pin 25 and abutment 26 the motion of carrier 15 will be accordingly varied or limited.

In order to adjust the back-off angle to any desired position, the shaft 13 is rotated either clockwise or counterclockwise depending on the direction of the adjustment which is desired. Rotation of shaft 13 rotates worm 12 which being in mesh with worm wheel 11, which is fixed to cage 8, will accordingly rotate the cage 8. The cage 8 carries with it the carrier member 15 on which the cutter adapter 4 is suspended.

It will be seen from FIGURE 3 that the line B—B represents the back-off direction when the back-off angle is zero. If the worm wheel 11 is rotated in a clockwise direction the back-off direction will vary from B—B to B–D for example. Similarly, rotation of the form wheel 11 in a counterclockwise direction will vary the back-off direction from B—B to B–C.

From the above it will be evident that a mechanism is provided which can vary the back-off angle through any desired amount and from one side of the zero angle to the other and this may be operable while the cutting process is occurring and, if desired, this may be done through the application of suitable controls in a manner obvious to anyone skilled in the art.

If desired, a feed back control device FB may be geared through a chain of gears to worm 12 and in the case of a tape controlled machine, will indicate the back-off angle at any given time and, if the angle is correct, rotation of the worm 12 is stopped and the cutting action proceeds. If the worm is operated manually the operator rotates the worm until the feed back unit indicates the proper position and then rotation is stopped and again cutting proceeds.

Also shown in the drawings and particularly in FIGURE 2 are some of the basic gear shaper elements. Worm wheel 27 is fixed and drives the cutter spindle 7. Worm wheel 27 is rotated by worm 28 which, through the usual gearing, is rotated in harmony with the rotation of the work spindle on which the work piece W is mounted.

The reciprocating cutting action is obtained by reciprocating the cutter slide S in which the cutter spindle 7 is suitably mounted. This slide S is reciprocated by a rack 29 fixed thereto. This rack 29 is in mesh with a gear 30 which is oscillated through any suitable mechanism. Obviously as gear 30 is oscillated the cutter slide S will be reciprocated to obtain the requisite cutting action.

Figures 4, 5:
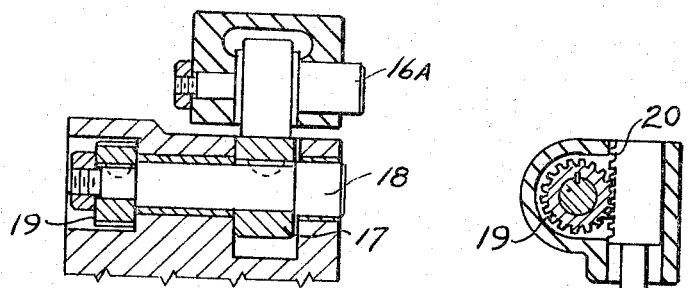
FIGURE 4 is a partial sectional view taken along the line 4—4 of FIGURE 2.
FIGURE 5 is a partial sectional view taken along the line 5—5 of FIGURE 3.

The eccentric mounting of the roller 16 on eccentric shaft 16A permits minor adjustments between roller 16 and cam 17. By simply rotating the shaft 16A by gripping its right hand extension as viewed in FIGURE 4, it will be seen that the spacing of roller 16 and cam 17 may be increased or decreased, and accordingly the amount of back-off may be minutely adjusted.

The machine of the present invention is of particular importance in the cutting of non-circular gears. One factor in determining the amount of rub which is obtained between cutter and work is the relative pitch diameters of these two elements.

Figure 6:
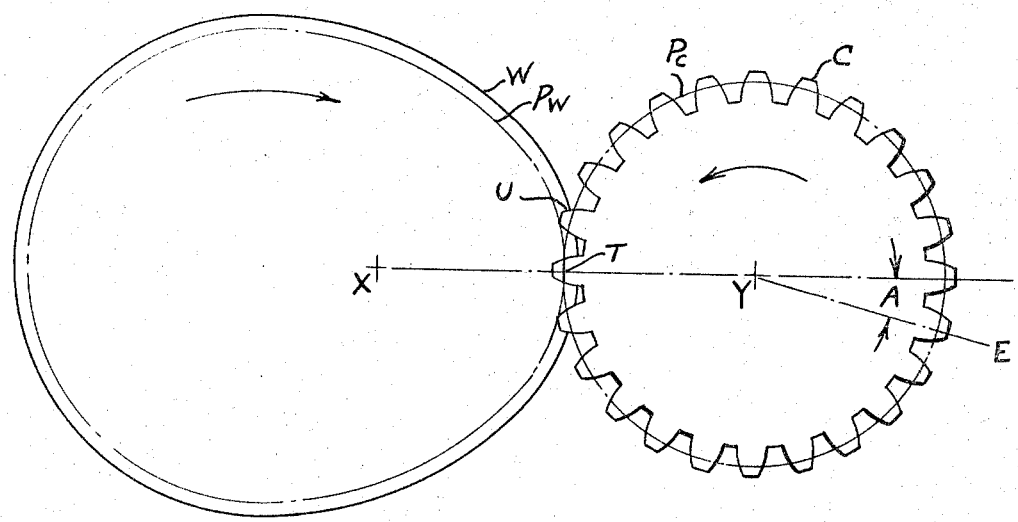
FIGURES 6 and 7 are diagrams showing the relationships of cutter and work in two different positions and the change in direction of back off necessary with the change in relative position.
Figure 7:
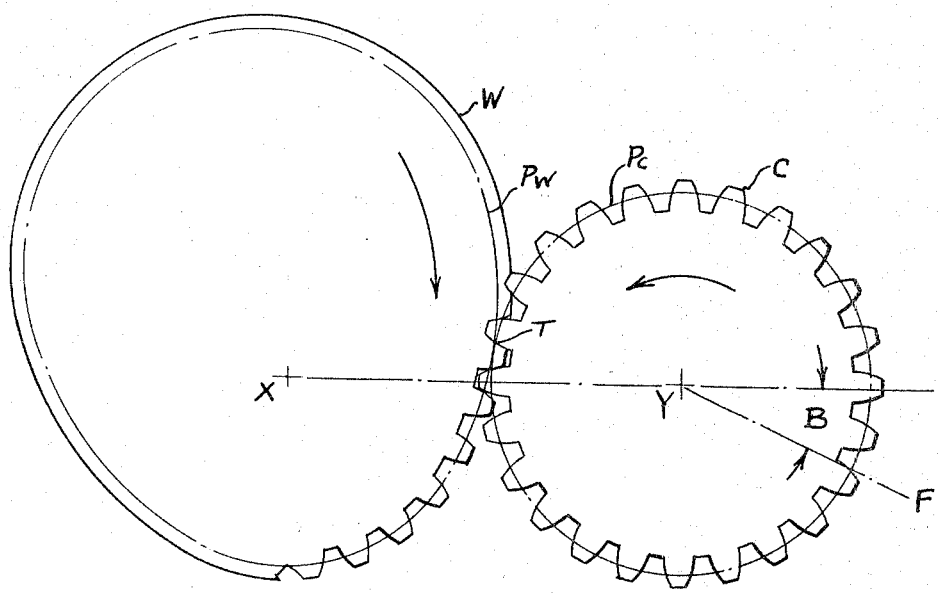

As shown in FIGURES 6 and 7, a non-circular gear W is being cut by a gear shaper cutter C. These two figures show the change in the direction of the line of back-off as the cutting of the gear proceeds and are only two examples of the changes which occur in the direction of back-off during the cutting of the gear W.

In FIGURE 6 the cutter C and gear W are shown in position where a concentric portion of gear W is being formed. In this position the line X–Y drawn between the center of rotation X of the work W and the center of rotation Y of the cutter C is diametrically disposed with respect to both the cutter and the work and the point of tangency T of the pitch circues PW and PC lies on the line X–Y. It might normally be supported that the direction of back-off in this position would be along the line X–Y if rub is to be avoided on the non-cutting stroke of the cutter C. However, as is well-known to anyone skilled in the art, rub will still occur if the back-off direction is along the line X–Y. This latter mentioned interference is due to the fact that in the gear shaping process the cutter and work are continuously rotating and the cutter must be backed off along a line such as Y–E to avoid any interference at the point U due to rotational feed of the work.

In FIGURE 7 is shown a portion of the work gear W being cut in which position the diameter of the effective pitch circle PW is being increased over that of the diameter of the effective pitch circle PW as shown in FIGURE 6.

Due to the increasing diameter of the effective pitch circle, the point of tangency T between the pitched circles PW and PC will occur earlier than is shown in FIGURE 6, assuming for purposes of illustration that the work W is rotating clockwise and the cutter C counterclockwise. Obviously, because of this earlier engagement of the point of tangency, it is necessary to increase the angle of back-off from the angle A shown in FIGURE 6 to that of the angle B shown in FIGURE 7.

As the cutting of the non-circular work gear W progresses the angle of back-off must be varied accordingly in order to avoid rub and, therefore, wear on the cutter C and impairment of the finish on the work gear W.

It will be apparent that as the effective pitch diameter of the work gear W increases the back-off angle must be accordingly increased and conversely, as the effective pitch diameter is decreased the angle of back-off must be decreased if rub is to be avoided with its corresponding disadvantages.

The effect of the changing effective pitch diameters will change the angle of back-off necessary in accordance with the pitch circle relationship of cutter C and work gear W. Thus, as the effective pitch diameter of the work gear W increases, the back-off angle will be increased in a clockwise direction as viewed in FIGURES 6 and 7 and as the effective pitch diameter is decreased, the back-off angle will be accordingly reduced. This change of back-off angle may vary either clockwise or counterclockwise as viewed in FIGURES 6 and 7 depending upon the varying pitch diameters and other conditions.

In view of the above, it will be seen that it is important in the gear shaping field to be able to vary the direction of back-off while cutting a given work piece and that this is particularly true in the cutting of non-circular gears. This ability of directionally controlling the direction of back-off and also the new and improved mechanism for releasing the cutter C from contact with the work W during the non-cutting motion is concerned with the present invention.

What I claim and desire to secure by Letters Patent is:

1. In a machine of the character described for forming gears by the gear shaper process, a base, a work spindle rotatably journalled in said base adapted to have mounted thereon a work gear to be formed, a cutter spindle mounted on said base adjacent to said work spindle and adapted to hold a cutter thereon in position to incise said work gear to be formed, means to rotate said cutter spindle in timed rotation with said work spindle, means to reciprocate said cutter spindle relative to said work spindle, means to back off said cutter from said work gear spindle during the non-cutting reciprocation of said cutter spindle, and means to vary the direction of action of said back-off means while said work gear is being formed, said last named means being operative in accordance with any change in the relationship of cutter and work which would affect the conditions causing rub between cutter and work during the non-cutting stroke of said cutter spindle, said cutter spindle having means for mounting a cutter spindle adapter thereon on which a cutter is mounted, means to clutch and declutch said adapter from rotation with said cutter spindle, means to control the direction of movement of said cutter spindle adapter and means to change the direction of the action of said last named means whereby said direction of back-off is varied.

2. A machine as defined in claim 1 in which the means to control the direction of movement of said cutter spindle adapter consists of a pivotal mounting for said adapter, said mounting being mounted to rotate about said cutter spindle.

3. A machine as defined in claim 2 wherein a means is provided to rotate said pivotal mounting for said cutter spindle adapter about said cutter spindle whereby said direction of back-off may be varied.

4. In a machine for generating gears and the like by the gear shaping process, a base, a work spindle rotatably journalled in said base adapted to hold a work gear thereon, a column fixed on said base adjacent to said work spindle, a cutter carrying slide mounted to reciprocate on said column, a cutter spindle having a bore therein rotatably mounted in said slide, a cutter mounted on said cutter spindle, means to rotate said cutter spindle in timed rotation with the rotation of said work spindle, means to back off said cutter from contact with the work piece during the non-cutting reciprocation of said cutter, said last named means including a cutter spindle adapter mounted in the bore of said cutter spindle, clutch teeth formed on the end of said cutter spindle, complemental clutch teeth fixed to said cutter spindle adapter engageable with the teeth on said cutter spindle, means to disengage the clutch teeth on the adapter from the clutch teeth on said cutter spindle, said disengagement occurring through downward movement imparted to said adapter, an arcuate shoulder formed on said adapter engaging said bore, said last named means so acting with said arcuate shoulder to pivot said adapter about said shoulder during its downward movement whereby said cutter is backed off from the work.

5. In a machine of the character described for forming gears by the gear shaper process, a base, a work spindle rotatably journalled in said base adapted to have mounted thereon a work gear to be formed, a cutter spindle mounted on said base adjacent to said work spindle and adapted to hold a cutter thereon in position to incise said work gear to be formed, means to rotate said cutter spindle in timed rotation with said work spindle, means to reciprocate said cutter spindle relative to said work spindle, means to back off said cutter from said work gear during the non-cutting reciprocation of said cutter spindle, and means to vary the direction of action of said back-off means while said work gear is being formed, said last named means being operative in accordance with any change in the relationship of cutter and work which would affect the conditions causing rub between cutter and work during the non-cutting stroke of said cutter spindle, said cutter spindle having a bore formed therein, a cutter spindle adapter mounted in said bore, an arcuate shoulder formed on said adapter providing a bearing for said adapter in said bore about which said adapter may pivot, a pivotal mounting for said adapter, and means to impart motion to said adapter in a downward and arcuate direction so that said adapter may be simultaneously declutched from said cutter spindle and given a backing-off movement away from said work spindle.

6. A machine as defined in claim 5 in which means is provided to rotate said pivotal mounting about said cutter spindle whereby upon rotation of said mounting the direction of said backing-off movement may be varied.

7. A machine as defined in claim 5 in which said pivotal mounting is arranged to rotate about said cutter spindle, and means to rotate said pivotal mounting, said last named means being operable to vary the direction of said back-off.

References Cited by the Examiner

UNITED STATES PATENTS

| | | | |
|---|---|---|---|
| 2,125,304 | 8/1938 | Miller | 90—7 |
| 2,129,858 | 9/1938 | Miller | 90—7 |
| 2,266,889 | 12/1941 | Miller et al. | 90—7 |
| 2,736,240 | 2/1956 | Bean | 90—7 |
| 3,107,580 | 10/1963 | Eda | 90—7 |

WILLIAM W. DYER, Jr., *Primary Examiner.*